March 19, 1946. E. L. MACK 2,396,736
FASTENER
Filed April 1, 1942
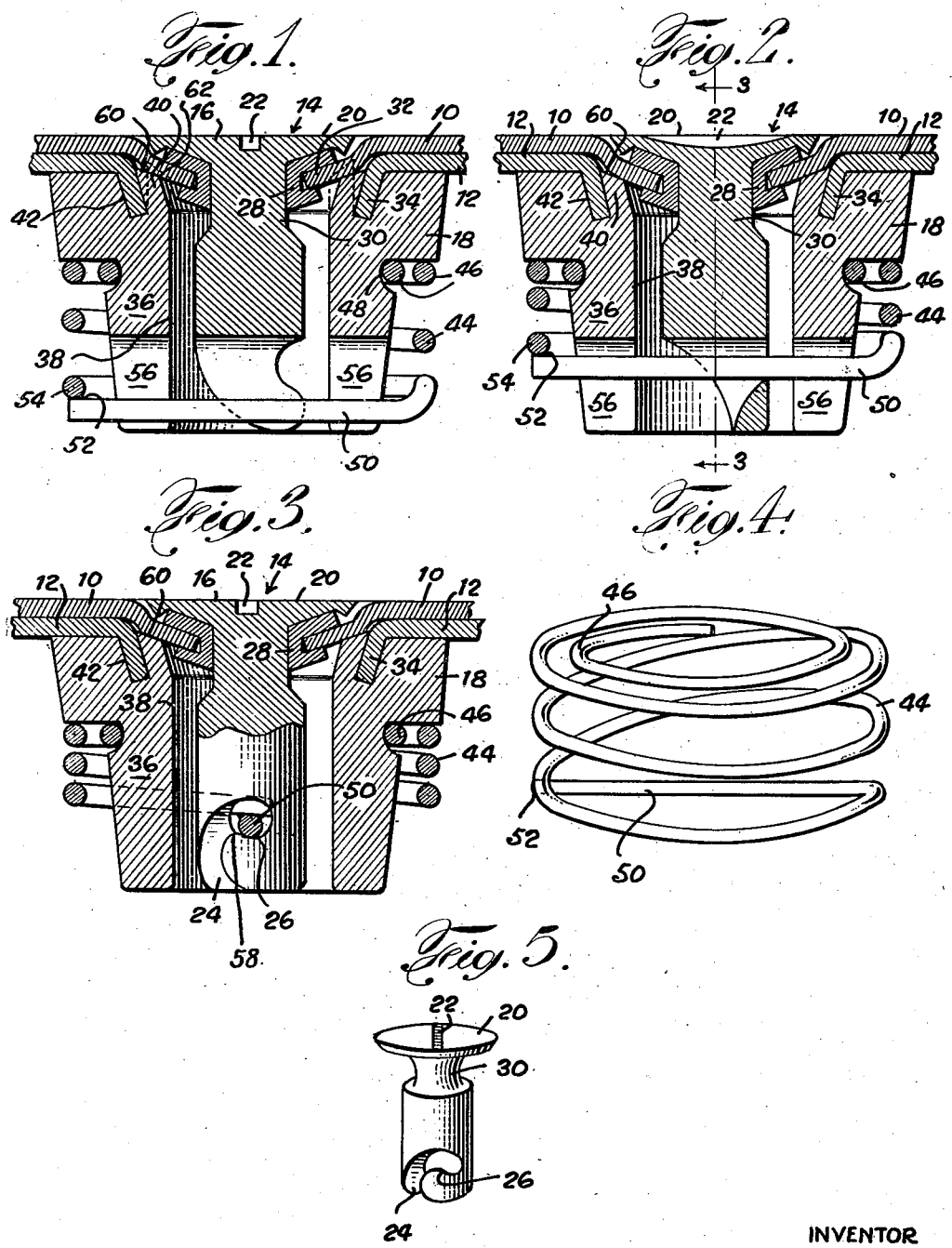
INVENTOR
Edward L. Mack Patented Mar. 19, 1946

2,396,736

UNITED STATES PATENT OFFICE 2,396,736

FASTENER

Edward L. Mack, New York, N. Y.

Application April 1, 1942, Serial No. 437,147

7 Claims. (Cl. 24—221)

This invention relates generally to a new and improved fastening device adapted for detachably fastening together two separate parts or sheets of material, and the invention particularly relates to an improved airplane cowl fastener, or fastener adapted to serve in a related manner for holding readily detachable sheet metal parts in close proximity under spring tension.

An object of the invention is to provide a fastener of this general type which has a minimum of simplified parts, which is economical to manufacture and to assemble, which also may be easily and efficiently applied in place upon the parts to be fastened by modern manufacturing practices, and wherein the fastened parts are quickly detachable and then replaceable to prior fastened position with little effort and simple tools.

With the above and other objects in view, my invention will be readily understood from a preferred illustrative embodiment hereinafter described in connection with the accompanying drawing which, it is to be understood, is not to be deemed as limiting the scope of my invention.

In the figures:

Fig. 1 is a section of a fastener embodying my invention with the parts in operative position but not in interlocked position.

Fig. 2 is a section similar to Fig. 1 with the fastener parts in interlocked position.

Fig. 3 is a section taken upon line 3—3 of Fig. 2.

Fig. 4 is a perspective view of a coil spring element adapted for connection upon the receptacle member of the fastener.

Fig. 5 is a perspective view on a smaller scale of a stud member adapted for use in my invention.

The embodiment of my invention shown in the above identified figures may be said to diagrammatically illustrate the connection of two plate members 10 and 12 of an airplane cowling assembly which is desired to hold in close proximity and relatively fixed position under spring tension by means of a fastener or coupling generally indicated as 14.

The fastener 14 comprises two main parts, namely a rotatable stud member 16 and a cooperative receptacle member 18 for detachable interlocking engagement therewith.

The rotatable stud member will normally be provided with a flat head member 20 having therein a slot 22 so that the stud member 16 may be rotated by means of a coin or screw driver or other tool being inserted in slot 22. Also stud member 16 has a solid shank as shown which is provided at its opposite end, preferably by a simple milling operation, with a spiral slot 24, ending at the inner extremity or recess of said slot as indicated in a detent or dwell 26. The stud member 16 may be rotatably connected to sheet 10 by virtue of a grommet 28 or other suitable fastening means, in such fashion that the outer portion of stud head 20 will be approximately flush with the outer portion of member 10. Also grommet 28, as shown, will normally be slidably engaged in reduced portion 30 of the shank of stud 16.

As is well understood in the art, sheet members 10 and 12 may have the necessary registering holes and general registering male and female annular dimple members or flange members 32 and 34 formed therein by adaptations of the usual conventional punch and forming die mechanisms now in common usage.

Cooperating with rotatable stud member 16 is the receptacle member 18 which will normally be formed as indicated as a base or collar member 36 provided with a central axial opening or bore 38 and having its external longitudinal wall generally tapered or formed in the shape of an inverted truncated cone as shown in Fig. 1.

The upper portion of receptacle 18 (in the relationship illustrated in the drawing) will be provided with shoulder 40 and an annular slot 42, it being understood that the shoulder 40 is so arranged that its metal can be formed outwardly by an expander tool so as to firmly grip downturned flange 34 of sheet member 12, as indicated.

As shown in the drawing, a coil spring 44 is preferably arranged with an overlapped coil 46 at its upper end adapted to snap into annular groove 48 formed in the outer wall of receptacle 18, and to remain in said groove under spring tension. The spring 44 is coiled around the lower tapered surface of receptacle 18 and a portion 50 of the end of said spring 44 is led centrally across the end ring of the cylindrically coiled spring, as at 52 to the adjacent coil 54, thus forming a cross-bar member to cooperate with spiral slot 24. If preferred the free end of portion 50 may be held in place by spot-welding, or the free end could well be anchored in any other suitable way in order to restrict its movement.

Portion 50 of spring 44 when its upper coil 46 has been snapped in groove 48 and when the spring has not been compressed will normally ride in transverse slots 56 formed in the lower portion of receptacle 18.

With the parts arranged as shown in Fig. 1 rotation of stud 16 will cause cross-bar member or portion 50 of spring 44 to ride upwardly in slot 24 of stud 16, and continued rotation will result in the deposition of the bar member in detent or dwell 26, in which position projection 58 of the detent will hold the cross-bar member 50 in firm interlocked position and therefore, the two cooperating fastener parts 16 and 18 will be held in firm detachable interlocked connection under spring tension, with the parts in the general relationship indicated in sectional Fig. 2.

As indicated in Fig. 1 when part 40 has been expanded to firmly engage annular flange member 34 of member 12, the upper surface of portion 40 will preferably be bevelled as at 60 to cooperate with bevelled surface 62 of the flange 32 of member 10, and it will be observed that the cooperation of these two bevelled surfaces operates as a centering means for associating the two main parts of the fastener both when the parts are to be fastened together and also as a bevelled centering means and wearing surface to overcome lateral stresses and vibratory movements of the fastener with the parts interlocked and with the cowling subjected to the movements attendant to its normal uses.

It will be recognized by those skilled in the are that my improved fastener comprises two main parts of simple construction, namely, a rotatable stud and a cooperating receptacle member and that the stud is simple to manufacture and to position in place in cowling member 10, as indicated. It will also be recognized that the receptacle member 18 is relatively simple to form by modern manufacturing practices and that spring member 44 may be readily assembled thereon by having an operator force coil 46 up the tapered side wall of receptacle 18 until the coil 46 snaps into annular groove 48 by virtue of the restricted diameter of spring coil 46. The parts may be arranged so that a quarter turn of stud member 16 will place cross-bar member 50 of spring 44 in detent 26 of slotted end 24 of the stud member and with the parts in such relationship spring 44 is under compression and further any tendency to separate sheets 10 and 12 will result in further compression of spring member 44 until cross-bar member 50 stops at the innermost recesses or bottoms of slots 56 and thereafter the full load is assumed by cross-bar 50, collar member 36 and stud member 16. This permits a nice adjustment of tolerances for limiting the travel of parts 10 and 12, as the load may first be assumed by the spring and later, as parts 10 and 12 separate further, the full load is taken up by substantially non-flexible parts. Alternatively the parts may be arranged with deeper slots 56 so that when the spring is compressed one coil against the other, the load is assumed by the coils, cross-bar and stud.

It will be further recognized that the embodiment of my invention above described is illustrative only and that substitutions of materials and parts, or reversals of parts may be made without avoiding the scope of my invention which is defined in the following claims.

What I claim is:

1. A detachable fastener for maintaining two parts locked in close proximity under spring tension, which includes a rotatable stud member for connection to one part, said stud being provided with a spiral slot in one end and a detent at the inner end of said slot, and a cooperating receptacle member for connection to the second part, said receptacle member being of generally truncated cone shape and having a longitudinal opening therethrough, said receptacle member including a tapered collar member having an annular groove at its inner end, a coil spring frictionally mounted in said annular groove, and a cross-bar member associated with said spring and adapted to be detachably locked within the detent of said spiral slot.

2. A detachable fastener for maintaining two parts locked in close proximity under spring tension, which includes a rotatable stud member for connection to one part, said stud being provided with a spiral slot in one end and a detent at the inner end of said slot, and a cooperating receptacle member for connection to the second part, said receptacle member including a collar member having an annular groove therein, a spring member encircling said collar member and frictionally mounted in said annular groove, and a cross-bar member associated with said spring member and adapted to detachably lock in said detent of said spiral slot with the spring under compression when the fastener stud and receptacle members are locked.

3. A detachable fastener for maintaining two parts locked in close proximity under spring tension, which includes a rotatable stud member for connection to one part, said stud being provided with a spiral slot in one end and a detent at the inner end of said slot, and a cooperating receptacle member for connection to the second part, said receptacle member including a tapered collar member having an annular groove therein, a spring member encircling said collar member and frictionally mounted in said annular groove, and a cross-bar member associated with said spring member and forming an integral part thereof and adapted to detachably lock in said detent of said spiral slot with the spring under compression when the fastener stud and receptacle members are locked.

4. A detachable fastener for maintaining two parts locked in close proximity under spring tension, which includes a rotatable stud member for connection to one part, said stud being provided with a spiral slot in one end and a detent at the inner end of said slot, and a cooperating receptacle member for connection to the second part, said receptacle member including a tapered collar member having an annular groove therein and also having a central opening and an end portion having a cross-slot, and a spring member encircling said collar member and frictionally mounted in said annular groove, and a cross-bar member associated with said spring member and forming an integral part thereof and adapted to detachably lock in said detent of said spiral slot with the spring under compression when the fastener stud and receptacle members are locked, said cross-bar member normally being positioned within said cross-slot of said collar member.

5. In a detachable fastener for maintaining two parts locked in close proximity under spring tension and of the type employing a rotatable slotted stud, a receptacle member which includes a collar member having an annular groove formed therein, a spring member associated with said collar member and frictionally mounted in said annular groove, and a crossbar member associated with said spring member and forming an integral part thereof, and adapted for interlocking engagement with said slotted stud.

6. In a fastener of the type employing a rotatable slotted stud and a receptacle member for receiving the stud and to be detachably interlocked therewith through the medium of a locking member and a spring, a locking member having a free end, and a helical spring surrounding said receptacle member and including at least one coil, said locking member being chordally disposed relative to said spring and having its end opposite said free end integral with said spring.

7. In a spring fastener of the type employing a rotatable slotted stud and a receptacle member for receiving the stud and to be interlocked therewith through the medium of a spring, a stud comprising a solid shank having a single slot with parallel sides extending without interruption from one side of the shank to the opposite side across the free end of said shank at its entrance end and therefrom extending spirally inward in the general direction of the shank axis, said slot terminating at its inner end in means constituting a detent for engagement with the spring.

EDWARD L. MACK.